United States Patent
Chen

(10) Patent No.: US 10,203,772 B2
(45) Date of Patent: Feb. 12, 2019

(54) HOTKEY TRIGGERING SYSTEM AND METHOD FOR AN ELECTRONIC DEVICE

(71) Applicants: Inventec (Pudong) Technology Corporation, Shanghai (CN); INVENTEC CORPORATION, Taipei (TW)

(72) Inventor: Chung-Hui Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 5 days.

(21) Appl. No.: 15/475,117

(22) Filed: Mar. 30, 2017

(65) Prior Publication Data
US 2018/0143699 A1    May 24, 2018

(30) Foreign Application Priority Data

Nov. 18, 2016    (CN) .......................... 2016 1 1019887

(51) Int. Cl.
*G06F 3/023* (2006.01)
*G06F 3/0482* (2013.01)

(52) U.S. Cl.
CPC ............ *G06F 3/0238* (2013.01); *G06F 3/023* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 2004/0042166 | A1* | 3/2004 | Huang | G06F 9/451 361/679.08 |
| 2009/0091538 | A1 | 4/2009 | Lan | |
| 2010/0049882 | A1* | 2/2010 | Tsao | G06F 3/023 710/18 |
| 2015/0317047 | A1* | 11/2015 | Lategan | G06F 3/0484 715/739 |
| 2016/0147691 | A1* | 5/2016 | Huang | G06F 3/0227 710/65 |

FOREIGN PATENT DOCUMENTS

| | | |
|---|---|---|
| CN | 1487394 A | 4/2004 |
| CN | 101354649 A | 1/2009 |
| TW | 201104503 A | 2/2011 |

* cited by examiner

*Primary Examiner* — Kenneth B Lee, Jr.
(74) *Attorney, Agent, or Firm* — CKC & Partners Co., Ltd.

(57) ABSTRACT

A hotkey triggering system for an electronic device includes a first key determination unit, a first key time determination, a second key determination unit and a hotkey processing unit. The first key determination unit is configured to determine whether a first key being pressed is a hotkey selection key. The first key time determination unit is configured to determine whether the first key is pressed for a sufficient period of time when the first key is determined to be the hotkey selection key. The second key determination unit is configured to determine whether a second key being pressed is a hotkey when the first key is determined to be pressed for the sufficient period of time. The hotkey processing unit is configured to execute a hotkey function when the second key is determined to be the hotkey, and the hotkey function includes varying hardware state of the electronic device.

6 Claims, 2 Drawing Sheets

HOTKEY TRIGGERING SYSTEM AND METHOD FOR AN ELECTRONIC DEVICE

RELATED APPLICATIONS

This application claims priority to Chinese Application Serial Number 201611019887.4, filed Nov. 18, 2016, which is herein incorporated by reference.

BACKGROUND

Technical Field

The present disclosure relates to a system and a method for triggering a hotkey of an electronic device.

DESCRIPTION OF RELATED ART

In recent years, with the popularization of electronic devices like laptop computers and tablet computers, the technology associated with electronic devices such as software and hardware have been developed accordingly. In general, an electronic device may provide a user with hotkeys, such that the user may quickly execute corresponding programs or functions by triggering the hotkeys, thereby saving the user's time for operating the electronic device.

However, a conventional method for triggering a hotkey of an electronic device requires a complicated and trivial operation, and the operation may cause a burden or an obstacle, and it is disadvantageous to a disabled person or an elderly person. Therefore, how to further improve a system and a method for triggering the hotkey of the electronic device to provide the user with a friendly and simple interface has become an important research and development issue, and has an urgent need to be improved in the related fields.

SUMMARY

The present disclosure relates to a system and method for triggering a hotkey of an electronic device, which may trigger the hotkey by pressing with one finger, so as to provide a user with a friendly and simple interface.

In accordance with some embodiments of the present disclosure, a hotkey triggering system for an electronic device includes a first key determination unit, a first key time determination unit, a second key determination unit, and a hotkey processing unit. The first key determination unit is configured to determine whether a first key of the electronic device being pressed is a hotkey selection key. The first key time determination unit is configured to determine whether the first key unit is pressed for a sufficient period of time when the first key is determined to be the hotkey selection key. The second key determination unit is configured to determine whether a second key of the electronic device being pressed is a hotkey when the first key is determined to be pressed for the sufficient period of time. The hotkey processing unit is configured to execute a hotkey function when the second key is determined to be the hotkey, and the hotkey function includes varying a hardware state of the electronic device.

In accordance with some embodiments of the present disclosure, a hotkey triggering system method for an electronic device includes following steps. A step is performed to determine whether a first key of the electronic device being pressed is a hotkey selection key. When the first key is determined to be the hotkey selection key, a step is performed to determine whether the first key is pressed for a sufficient period of time. When the first key is determined to be pressed for the sufficient period of time, a step is performed to determine whether a second key of the electronic device being pressed is a hotkey. When the second key is determined to be the hotkey, a hotkey function is executed for varying a hardware state of the electronic device.

In one or more embodiments of this disclosure, a user may sequentially press the first key and the second key, thereby triggering the hotkey function to execute a corresponding program or function for varying a hardware state of the electronic device. In other words, a duration of the first key being pressed is not overlapped with a duration of the second key being pressed. Therefore, the user may press the first key by pressing with one finger. Then, the user may press the second key by pressing with one finger, so as to trigger the hotkey of the electronic device in a manner of single key activation, thereby benefiting to provide the user with a friendly and simple interface.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
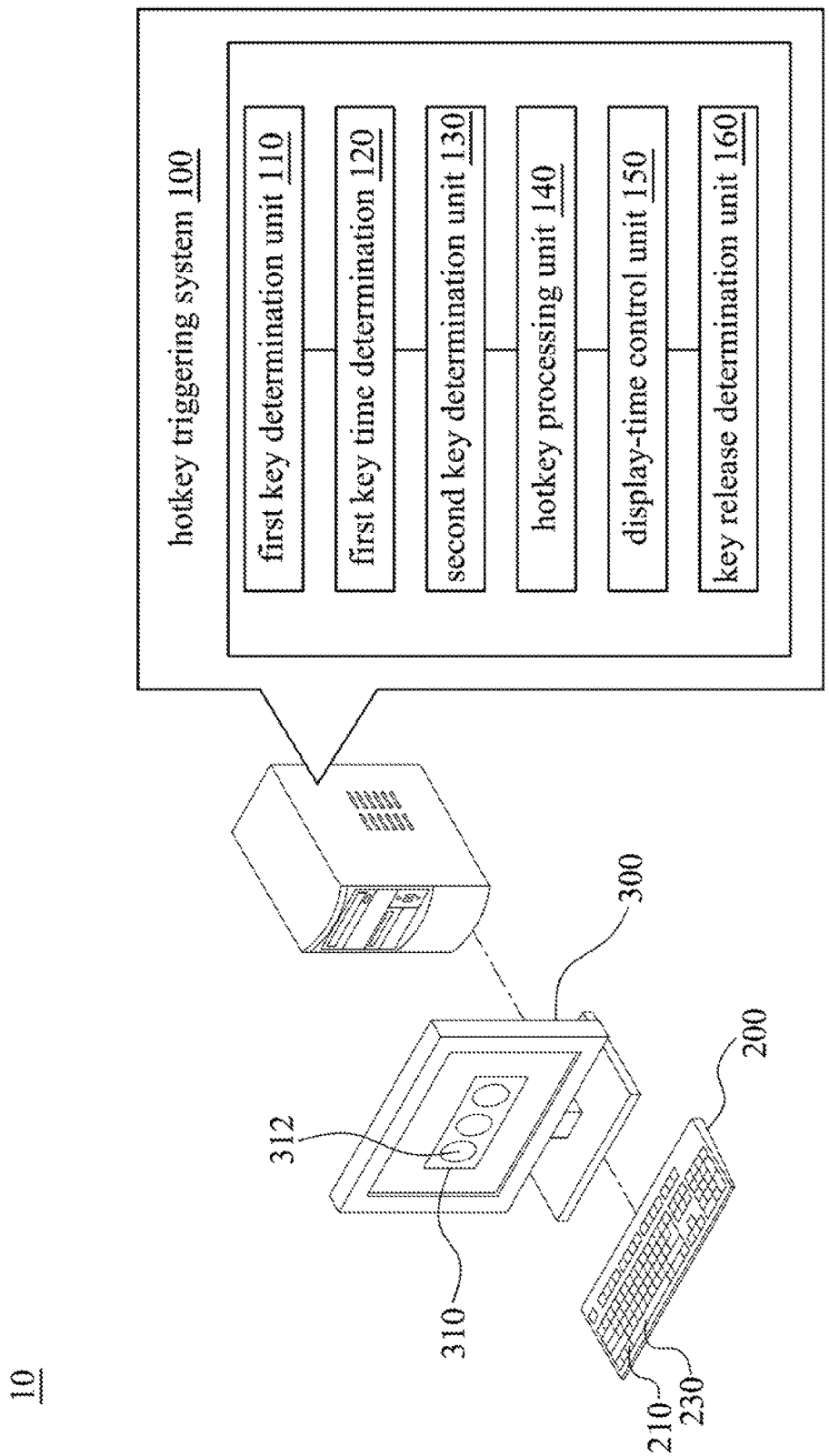
FIG. 1 is a schematic diagram of a hotkey triggering system for an electronic device in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 is a schematic diagram of a hotkey triggering system for an electronic device in accordance with some embodiments of the present disclosure. In some embodiments, an electronic device 10 includes a hotkey triggering system 100, an input unit 200 and a display unit 300. The hotkey triggering system 100, the input unit 200 and the display unit 300 are signally connected to each other, and a user may communicate with the hotkey triggering system 100 and the display module 300 via the input module 200.

As shown in FIG. 1, the hotkey triggering system 100 includes a first key determination unit 110, a first key time determination 120, a second key determination unit 130, and a hotkey processing unit 140. The first key determination unit 110 is configured to determine whether a first key 210 of the electronic device 10 being pressed is a hotkey selection key. The first key time determination unit 120 is configured to determine whether the first key 210 is pressed for a sufficient period of time when the first key 210 is determined to be the hotkey selection key. The second key determination unit 130 is configured to determine whether a second key 230 of the electronic device 10 being pressed is a hotkey when the first key 210 is determined to be pressed for the sufficient period of time. The hotkey processing unit 140 is configured to execute a hotkey function when the second key 230 is determined to be the hotkey.

As a result, by the hotkey triggering system 100, the user may sequentially press the first key 210 and the second key 230, thereby triggering the hotkey function to execute a corresponding program or function for varying a hardware state of the electronic device 10. In other words, the duration of the first key 210 being pressed is not overlapped with the duration of the second key 230 being pressed. Therefore, the user may press the first key 210 by pressing with one finger. Then, the user may press the second key 230 by pressing with one finger, so as to trigger the hotkey of the electronic device 10 in a manner of single key activation, thereby benefiting to provide the user with a friendly and simple interface.

In some embodiments, the hotkey function executed by the hotkey processing unit 140 includes varying the hardware state of the electronic device 10. For example, the hardware state may be, but not limited to be, brightness or a color saturation of the display unit 300, or a volume of the electronic device 10.

In some embodiments, the electronic device 10 may be, but not limited to be, a laptop computer or a tablet computer. In some embodiments, the input module 200 may be, but not limited to be, a keyboard, such as a wireless keyboard or a wire keyboard. In some embodiments, when the input module 200 is the keyboard, the first key 210 and the second key 230 may be any key of the keyboard, and a specific key of the keyboard may be the hotkey selection key or the hotkey. For example, an Alt key, a Ctrl key or a Menu key may be preset as the hotkey selection key, and the number keys of the keyboard, such as 1, 2, 3 . . . , 9 or the combination thereof may be preset as the hotkeys, but are not limited thereto. In other embodiments, the input unit 200 may be touch-sensitive screen, and the first key 210 and the second key 230 may be keys of a virtual keyboard displayed by the touch-sensitive screen.

In some embodiments, the first key determination unit 110, the first key time determination 120, the second key determination unit 130, and the hotkey processing unit 140 may be integrated into one or more processing devices of the electronic device 10. The processing device may be, but not limited to be, a central processing unit, a controller, a microprocessor, a sever, or any other hardware can process instructions.

In other embodiments, the first key determination unit 110, the first key time determination 120, the second key determination unit 130, and the hotkey processing unit 140 may be executed by a computer program of an electronic device and be stored in a storage device. The storage device may include a non-transient computer readable recording medium or other device having a storage function. The computer program may include, but not limited to, program instructions which can be executed by a central processing unit, so as to execute the respective functions of the modules.

More particularly, in some embodiments, taking a computer as an example, the user may install a hotkey processing program A in the computer. The hotkey processing program A resides in a system memory of the computer, and uses a hook mechanism of an operating system of the electronic device 10 to await triggering events of the first key 210 and the second key 230. In other words, the central processing unit of the computer executes the corresponding functions of the first key determination unit 110, the first key time determination 120, the second key determination unit 130, and the hotkey processing unit 140 by the hotkey processing program A. As a result, when the user presses the first key 210 or the second key 230 of the electronic device 10, the hotkey triggering system 100 may hook the trigger event of the first key 210 or the second key 230 by the hotkey processing program A and the hook mechanism. Then, the central processing unit of the computer may execute hotkey function corresponding to the second key 230 by the hotkey processing program A without calling or querying a basic input/output system (BIOS) to obtain an instruction corresponding to second key 230 (or hotkey), so as to trigger the hotkey in a one-way communication manner (that is, the manner of single key activation).

It is to be understood that the conventional system for triggering the hotkey of the electronic device is to execute the corresponding program or function of the hotkey in a two-way communication manner. In other words, when the computer determines the hotkey to be triggered, the basic input/output system may output a system management interrupt signal to the central processing unit. Then, the central processing unit may query the basic input/output system by a firmware interface to obtain the instruction for executing the corresponding program or function of the hotkey. The two-way communication manner may easily cause the operating system of the computer to be unstable, thus affecting a stability of the operating system. In one or more embodiments of this disclosure, the hotkey triggering system 100 may be triggered and execute the hotkey function in the one-way communication manner. That is, the central processing unit may obtain the corresponding hotkey instruction without calling the basic input/output system, so as to prevent the operating system from being unstable caused by the two-way communication manner.

In some embodiments, when the first key 210 is determined to be pressed for the sufficient period of time, the hotkey function is executed independently regardless of whether the first key 210 is pressed. More particularly, the first key 210 may be connected to a key controller. When the first key 210 is pressed by the user, the key controller may send a first key signal to the hotkey triggering system 100. The first key signal may have an effect on the first key determination unit 110, the first key time determination 120, and the second key determination unit 130, but first key signal may not affect the hotkey processing unit 140. Similarly, the second key 230 may also be connected to the key controller. When the second key 230 is pressed by the user, the key controller may send a second key signal to the hotkey triggering system 100, and the second key signal may have an effect only on the hotkey processing unit 140. As a result, the hotkey processing unit 140 may merely be affected by the second key signal generated by the second key 230, and may not be affected by the first key signal generated by the first key 210.

In some embodiments, the display unit 300 is configured to display a hotkey function menu 310 when the first key 210 is determined to be pressed for the sufficient period of time, and at least one pattern 312 of the hotkey function menu 310 relates to the hotkey. More particularly, when the user presses the first key 210 for a period of duration of time that is greater than a first predetermined period of time, the display unit 310 may display the hotkey function menu 310. The first predetermined period of time ranges from 200 ms to 600 ms. In some embodiments, for example, the first predetermined period of time may be, but not limited to be, 300 ms, 400 ms, or 500 ms. More particularly, when the first predetermined period of time is unduly short (for example, the first predetermined period of time is less than 200 ms), it may easily affect the triggering event for the original function of the key. When the first predetermined period of time is unduly long (for example, the first predetermined period of time is greater than 600 ms), it may increase the waiting time for the user, thus affecting the user's operating experience. Therefore, the first predetermined period of time ranges from 200 ms to 600 ms, and the preferred first predetermined period of time may be, but not limited to be, 500 ms.

In some embodiments, the hotkey function menu 310 may provide the user with one or more hotkeys and the corresponding information of the hotkey function. In some embodiments, for example, the hotkey function menu 310 may include a plurality of patterns 312, and each of the patterns 312 may display a corresponding image of the hotkey and the corresponding information of the hotkey function after the hotkey is pressed, but it is not limited thereto.

In some embodiments, the hotkey triggering system 100 further includes a display-time control unit 150. The display-time control unit 150 is configured to stop displaying the hotkey function menu 310 after the second key 230 is determined to be the hotkey. In other words, when the second key 230 is determined to be the hotkey, the display-time control unit 150 may make the display unit 300 not display the hotkey function menu 310, so that the user may continue watching an original view on the display unit 300. In other embodiments, the display-time control unit 150 is further configured to determine whether the hotkey function menu 310 is displayed for a sufficient period of time. When the hotkey function menu 310 is displayed for more than a second predetermined period of time, the display-time control unit 150 may stop displaying the hotkey function menu 310. The second predetermined period of time ranges from 1000 ms to 5000 ms. For example, the second predetermined period of time may be, but not limited to be, 1000 ms or 2000 ms. More particularly, the second predetermined period of time is a period time for which the hotkey menu function stays displaying on the display unit 300. When the second predetermined period of time is unduly short (for example, the second predetermined period of time is less than 1000 ms), the user may not be able to efficiently receive the information provided by the hotkey function menu 310 due to the short display-time of the hotkey function menu 310. When the second predetermined period of time is unduly long (for example, the second predetermined period of time is greater than 5000 ms), it may have an impact for the user on watching the original view on the display unit 300. Therefore, the second predetermined period of time ranges from 1000 ms to 5000 ms, and the preferred second predetermined period of time may range, but not limited to, from 1000 ms to 2000 ms, or from 2000 ms to 3000 ms.

In some embodiments, the hotkey triggering system 100 further includes a key release determination unit 160. The key release determination unit 160 is configured to determine whether the first key 210 is released when the first key 210 is determined to be the hotkey selection key. Furthermore, the second key determination unit 130 is further configured to determine whether the second key 230 is the hotkey when the first key 210 is determined to be pressed for the sufficient period of time and after the first key 210 is determined to be released. In other words, after the first key 210 is determined to be released, the second key determination unit 130 may start to execute the determination of the second key 230. That is, if the user press a plurality of keys at the same time, the hotkey triggering system 100 may not active the second key determination unit 130 to execute the determination of the second key 230, because the key release determination unit 160 may not determine one of the keys to be released.

In some embodiments, the display-time control unit 150 and key release determination unit 160 may be integrated into one or more processing devices of the electronic device 10. The processing device may be, but not limited to, a central processing unit, a controller, a microprocessor, a sever, or any other hardware can process instructions. In other embodiments, the display-time control unit 150 and the key release determination unit 160 may be executed by a computer program of an electronic device and be stored in a storage device, but it is not limited thereto.

Figure 2:
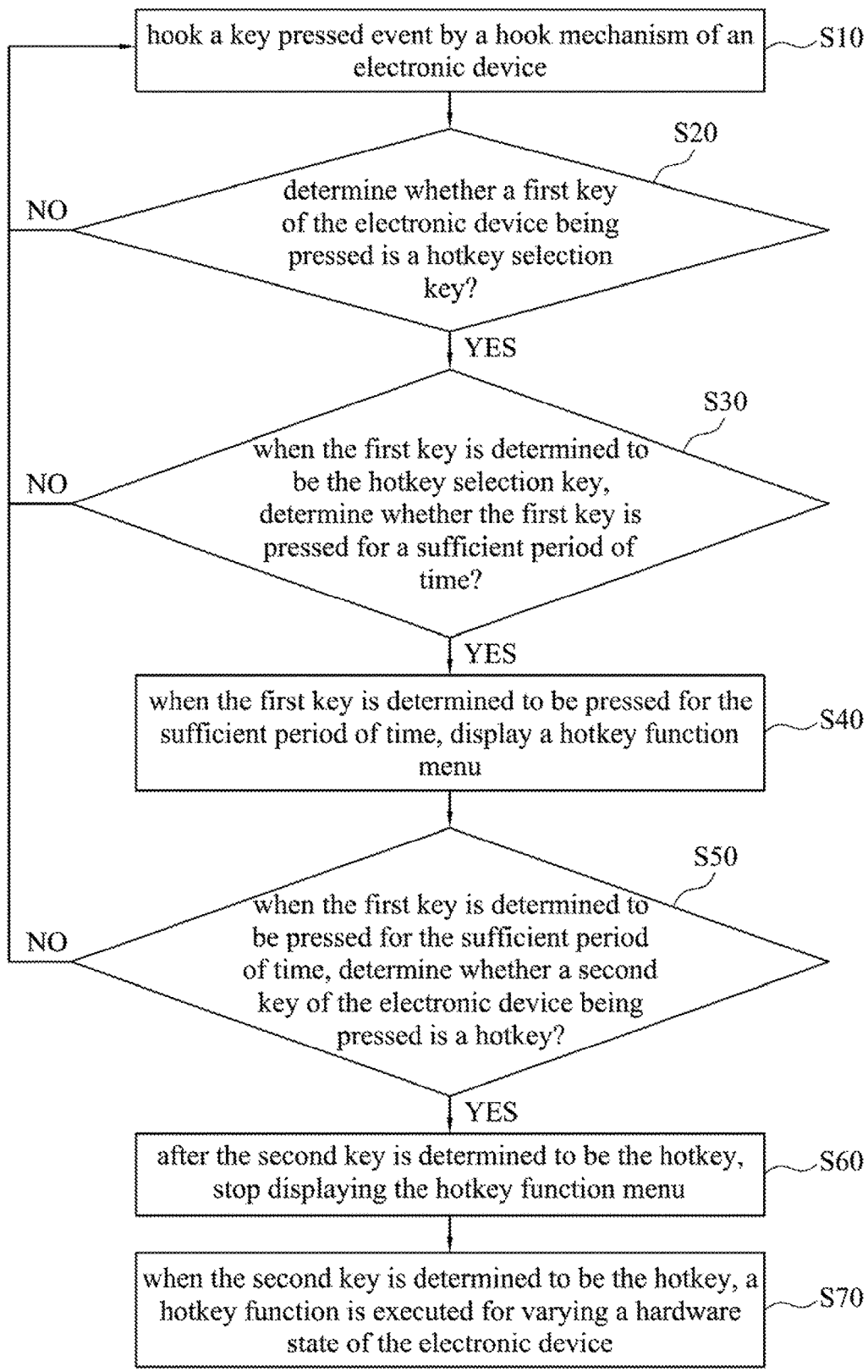
FIG. 2 is a flow chart of a hotkey triggering method for an electronic device in accordance with some embodiments of the present disclosure.

Reference is made to FIG. 2. FIG. 2 is a flow chart of a hotkey triggering method for an electronic device in accordance with some embodiments of the present disclosure. In some embodiments, the hotkey triggering method for the electronic device includes the following steps. In step S10, a key pressed event is hooked by the hook mechanism of the operating system of the electronic device 10. In step S20, when the key pressed event is hooked, an operation is performed to determine whether the first key 210 of the electronic device 10 being pressed is a hotkey selection key. If the first key 210 is determined to be the hotkey selection key, step S30 is performed. If the first key 210 is determined not to be the hotkey selection key, step S10 is performed to continue hooking the key pressed event. In step S30, when the first key 210 is determined to be the hotkey selection key, an operation is performed to determine whether the first key 210 is pressed for a sufficient period of time. If the first key 210 is determined to be pressed for the sufficient period of time, step S40 is performed. If the period of time for pressing the first key 210 is determined to be not enough, step S10 is performed to continue hooking the key pressed event. In step S40, when the first key 210 is determined to be pressed for the sufficient period of time, an operation is performed to display the hotkey function menu 310. Then, in step S50, when the first key 210 is determined to be pressed for the sufficient period of time, an operation is performed to determine whether the second key 230 of the electronic device 10 being pressed is a hotkey. If the second key 230 is determined to be the hotkey, step S60 is performed. If the second key 230 is determined not to be the hotkey, step S10 is performed to continue hooking the key pressed event. In step S60, an operation is performed to stop displaying the hotkey function menu 310 after the second key 230 is determined to be the hotkey. Then, in step S70, when the second key 230 is determined to be the hotkey, a hotkey function is executed for varying a hardware state of the electronic device 10.

In some embodiments, before step S20, the hotkey triggering method for the electronic device further includes step S15. In step S15, when the key pressed event is hooked, an operation is performed to determine whether the electronic device 10 displays the hotkey function menu 310. If the electronic device 10 is determined to display the hotkey function menu 310 in step S15, the following steps are performed. An operation is performed to determine whether the first key 210 of the electronic device 10 being pressed is the hotkey. If the first key 210 is determined to be the hotkey, an operation is performed to stop displaying the hotkey function menu 310. Then, the hotkey function is executed for varying the hardware state of the electronic device 10. If the electronic device 10 is determined not to display the hotkey function menu 310 in step S15, step S20 is performed.

In some embodiments, in step S30, when the first key 210 is determined to be the hotkey selection key, an operation is performed to determine whether the first key 210 is pressed for the sufficient period of time, and another operation is further performed to determine whether the first key 210 is determined to be released. After the time for pressing the first key 210 is determined to be enough and the first key 210 is determined to be released, an operation is performed to determine whether the second key 230 is the hotkey. In other words, in such embodiments, after meeting the conditions of "the time for pressing the first key 210 is enough" and "the first key is determined to be released", the step of "determining whether the second key 230 is the hotkey" is performed, so that the user may trigger the hotkey by pressing with one finger.

As a result, the electronic device 10 may sequentially determine the first key 210 and the second key 230 by the hotkey triggering method, so that the user may sequentially press the first key 210 and the second key 230 by pressing with one finger. Then, the user may press the second key 230 by pressing with one finger, so as to trigger the hotkey of the electronic device 10 in a manner of single key activation, thereby benefiting to provide the user with a friendly and simple interface.

Although the present invention is described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hotkey triggering system for an electronic device, comprising:
   a first key determination unit configured to determine whether a first key of the electronic device being pressed is a hotkey selection key;
   a first key time determination unit configured to determine whether the first key is pressed for a sufficient period of time when the first key is determined to be the hotkey selection key;
   a second key determination unit configured to determine whether a second key of the electronic device being pressed is a hotkey when the first key is determined to be pressed for the sufficient period of time;
   a hotkey processing unit configured to execute a hotkey function when the second key is determined to be the hotkey, wherein the hotkey function includes varying a hardware state of the electronic device;
   a display unit configured to display a hotkey function menu when the first key is determined to be pressed for the sufficient period of time, and at least one pattern of the hotkey function menu relates to the hotkey, and
   a display-time control unit configured to stop displaying the hotkey function menu after the second key is determined to be the hotkey.

2. The hotkey triggering system of claim 1, wherein when the first key is determined to be pressed for the sufficient period of time, the hotkey function is executed independently regardless of whether the first key is pressed.

3. The hotkey triggering system of claim 1, further comprising:
   a key release determination unit configured to determine whether the first key is released when the first key is determined to be the hotkey selection key, wherein the second key determination unit is configured to determine whether the second key is the hotkey when the first key is determined to be pressed for the sufficient period of time and after the first key is determined to be released.

4. A hotkey triggering method for an electronic device, comprising:
   determining whether a first key of the electronic device being pressed is a hotkey selection key;
   when the first key is determined to be the hotkey selection key, determining whether the first key is pressed for a sufficient period of time;
   when the first key is determined to be pressed for the sufficient period of time, determining whether a second key of the electronic device being pressed is a hotkey;
   when the second key is determined to be the hotkey, executing a hotkey function for varying a hardware state of the electronic device;
   when the first key is determined to be pressed for the sufficient period of time, displaying a hotkey function menu, and at least one pattern of the hotkey function menu relates to the hotkey; and
   after the second key is determined to be the hotkey, slopping displaying the hotkey function menu.

5. The hotkey triggering method of claim 4, wherein when the first key is determined to be pressed for the sufficient period of time, the hotkey function is executed independently regardless of whether the first key is pressed.

6. The hotkey triggering method of claim 4, further comprising:
   when the first key is determined to be the hotkey selection key, determining whether the first key is released, wherein when the first key is determined to be pressed for the sufficient period of time and after the first key is determined to be released, determining whether the second key is the hotkey.

* * * * *